(12) United States Patent
Lipani, Sr.

(10) Patent No.: US 11,140,968 B1
(45) Date of Patent: Oct. 12, 2021

(54) EASY LIFT

(71) Applicant: Robert M. Lipani, Sr., McKinney, TX (US)

(72) Inventor: Robert M. Lipani, Sr., McKinney, TX (US)

(*) Notice: Subject to any disclaimer, the term of this patent is extended or adjusted under 35 U.S.C. 154(b) by 0 days.

(21) Appl. No.: 17/033,710

(22) Filed: Sep. 26, 2020

Related U.S. Application Data

(60) Provisional application No. 62/907,734, filed on Sep. 30, 2019.

(51) Int. Cl.
| | |
|---|---|
| *A61F 5/08* | (2006.01) |
| *A45D 44/22* | (2006.01) |
| *G02C 1/06* | (2006.01) |
| *G02C 5/22* | (2006.01) |
| *G02C 5/14* | (2006.01) |

(52) U.S. Cl.
CPC .............. *A45D 44/22* (2013.01); *G02C 1/06* (2013.01); *G02C 5/146* (2013.01); *G02C 5/22* (2013.01)

(58) Field of Classification Search
CPC .......... A45D 44/22; G02C 1/06; G02C 5/146; G02C 5/22
USPC ...................................... 351/158; 606/204.35
See application file for complete search history.

(56) References Cited

U.S. PATENT DOCUMENTS

| | | | |
|---|---|---|---|
| 2005/0206836 A1* | 9/2005 | Shapiro | G02C 9/00 351/110 |
| 2015/0216288 A1* | 8/2015 | Offner | A45D 44/22 351/158 |

* cited by examiner

*Primary Examiner* — William Choi

(57) ABSTRACT

A pair of eyeglass installed with a pair of skin chambers to reduce wrinkles in a user's face is disclosed. Each skin chamber comprises a cavity, a pair of hinge pins, a pair of internal edges, and a rear plate. The skin chambers are mounted on the inside of a pair of temples via the hinge pins. The hinge pins are configured to fit into a pair of hinge pin sockets molded in the interior surface of the temples. The skin chambers are designed to reduce the wrinkles in the facial skin by pulling the excess skin upward towards the temple of the eyeglass and tucked into the cavity of the skin chamber. The internal edges include rounded edges, thereby proving maximum comfort to the skin for a longer duration without any pain to the user. Further, the skin chamber allows the skin to comfortably move during usage.

16 Claims, 9 Drawing Sheets

EASY LIFT

BACKGROUND OF THE INVENTION

A. Technical Field

The present invention generally relates to eyeglasses or spectacles. More specifically, the present invention relates to an eyeglass having novel structural features facilitating removing wrinkles in a user's face.

B. Description of Related Art

In modern society, the process of aging is measured in whole years since the person's date of birth. Due to aging, the elasticity of the skin is reduced and forms wrinkles in the skin. The wrinkles in the forehead, cheeks, and temple area are the most prominent facial features which exhibit the aging characteristics.

Generally, the aging process is an undesirable phenomenon and many individuals around the world are seeking to improve and maintain a youthful physical appearance and attitude through the use of a variety of cosmetic products and skincare treatments. The strength and beauty associated with youth are compelling, and no one wishes to lose any of those attributes while living their lives. People are spending millions of dollars on cosmetics and other means to enhance, regain, or maintain a youthful appearance. However, these measures are temporary solutions, and preventing aging is impossible and could only be postponed for a short period of time.

Modern technology and medical advances have enabled the human population to live longer and healthier lives well into ages that are thought impossible just a few years ago. As the population ages and longevity increases, the number of persons entering late adulthood multiplies as a consequence. The group becomes a marketing demographic available to new ideas and devices that could make the aging process more manageable and prolong the decline in youthful appearance.

Both, the cosmetic industry and the medical profession have been able to exploit the aging demographic with new products and ideas. The medical profession in the science of surgery has introduced the facelift and other surgical procedures with varying results depending on the individual and the work that has been done. The issue with medical procedures is the cost associated with any of the methods, and that is prohibitive to many of the persons entering late adulthood since it is hard to afford the procedures or have difficulty with the pain that is also associated with medical procedures of this type.

The aging demographics could benefit from technology and devices that could help the person to maintain the youthful appearance without the significant commitment to cosmetic surgery or other methods that are prohibitively expensive, painful, or not suitable or very slow to be effective. Currently, the typical person with wrinkled skin has few effective non-surgical options to reduce wrinkles without resorting to procedures like Botox injections, wrinkle fillers, laser light resurfacing, chemical peels, or dermabrasion. However, these procedures are expensive, time-consuming, and could create some debilitating side effects.

Therefore, there is a need for an apparatus designed to provide an effective method of removing wrinkles and sagging skin in a user's face, thereby providing a tighter and more youthful appearance.

SUMMARY OF THE INVENTION

The present invention generally discloses about eyeglasses. Further, the present invention discloses an innovative and intelligent apparatus designed to reduce or eliminate the wrinkles in a user's face.

According to the present invention, the eyeglass is installed with a pair of easy lift apparatus or a pair of skin chamber (hereinafter referred to skin chamber). The skin chamber is an innovative and intelligent solution designed to lift the skin in the face, thereby eliminating wrinkles in the user face for making a wrinkle-free appearance to the face. The skin chamber grips the excess skin experienced during aging and painlessly tucks into the skin chamber to create a tighter and more youthful appearance.

The eyeglass comprises a frame, a pair of lens holders, a pair of earpieces or temples and a pair of nosepieces. The eyeglass is fabricated with a standard eyeglass's technique, which are equipped with the inner surface of each temple. After placing the eyeglass on the user's head, the excess skin near the temple gets compressed. The excess skin in the face is inserted into the skin chamber, where the excess skin is gently captured. In one embodiment, the skin chamber configuration provides an optimum comfortable fit to the skin. Therefore, the skin could be tensioned in the skin chamber for a longer duration, for instance, a whole day, without any discomfort. In one embodiment, the frame, the pair of temples, and the skin chambers are molded using the same lightweight plastic material. The lightweight plastic could be lightweight hypoallergenic plastic. The plastic could be supplied in almost any vibrant designer color and shape.

In one embodiment, the skin chamber comprises a cavity or a channel, a pair of hinge pins, a pair of internal edges, and a rear plate. The skin chambers are mounted on the inside of the temples via the pair of hinge pins. The hinge pins are molded at the distal ends of the rear plate of the skin chambers. In one embodiment, the pair of hinge pins are configured to fit into a pair of hinge pin sockets or a pair of pivot points molded into the interior surface of the temples. In one embodiment, the internal edges comprise rounded edges to provide maximum comfort to the user. Also, the internal edges are angled enough to retain the skin comfortably inside the cavity.

In one embodiment, the skin chamber is designed to provide an effective method of griping the excess skin, thereby removing the wrinkles and sagging skin for making the user face with a tighter and more youthful appearance. The loose or sagging skin from bones of the lower face, forehead, temples behind the eyes, cheeks, and around the mouth could be smoothed out using the skin chamber. A section of sagging skin from the face is pulled up and placed within the cavity of skin chambers mounted on the inside of the temples. In one embodiment, the cavity with the rear plate of the skin chamber is designed in such a way to hold the skin and pivots a certain amount rotation to allow the movement of the skin and keep the skin from falling out.

In another embodiment, the skin chamber comprises a hinged top surface, a lower edge, a cavity or a channel, a pair of locks, a pair of tongues, and a rear surface. The excess skin is pulled up and placed over the lower edge in the cavity by unlatching the hinged top surface. The hinged top surface is then closed by pressing into the skin chamber. In one embodiment, the locks are spring-loaded locks. In one embodiment, the tongue slides into the opening to close the skin chamber. The skin chamber is bonded to the temple using a thin spacer, thereby allowing the easy insertion of the excess facial skin into the cavity of the skin chamber. The cavity could grip the excess skin without any pain to the user, where the skin pulled tighter which reduces the wrinkles and lines on the face.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1A:
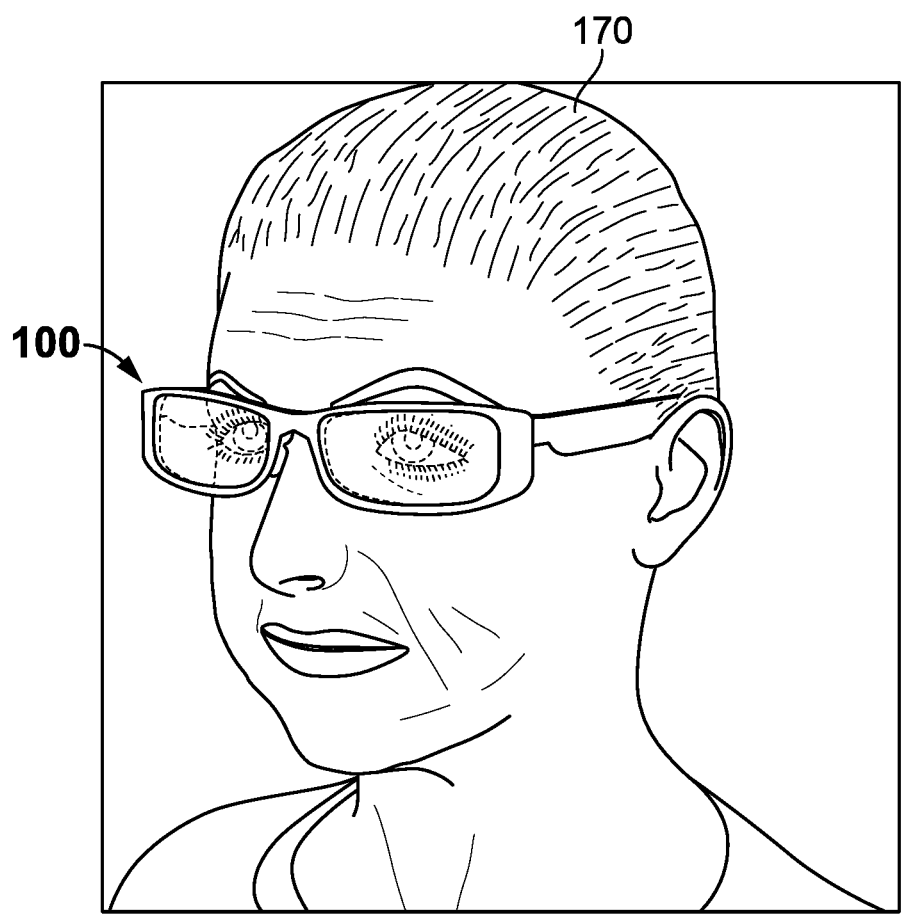
FIG. 1A shows an eyeglass without an easy lift apparatus worn by a user in a typical use case in an embodiment of the present invention.
Figure 1B:
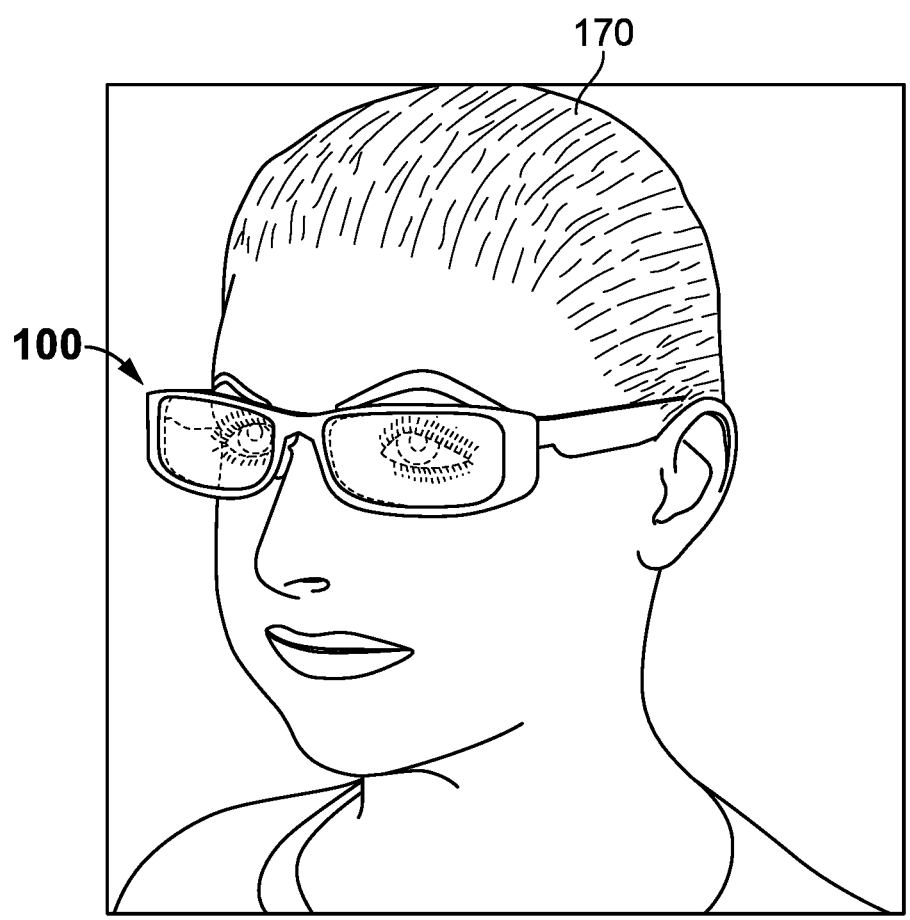
FIG. 1B shows the eyeglass installed with the easy lift apparatus worn by the user in a typical use case in an embodiment of the present invention.

Referring to FIGS. 1A and 1B, a pair of eyeglass or spectacles (hereinafter referred as eyeglass) 100 worn by a user 170 before installing and after installing a pair of easy lift apparatus or a pair of skin chamber 110 (shown in FIG. 2) (hereinafter referred as skin chamber) respectively, according to one embodiment of the present invention. The skin chamber 110 is an innovative and intelligent solution designed to lift the skin in the face, thereby eliminating wrinkles in the user face for making a wrinkle-free appearance to the face. The skin chamber 110 grips the skin experienced during aging and painlessly tucks to create a more youthful appearance.

Figure 2:
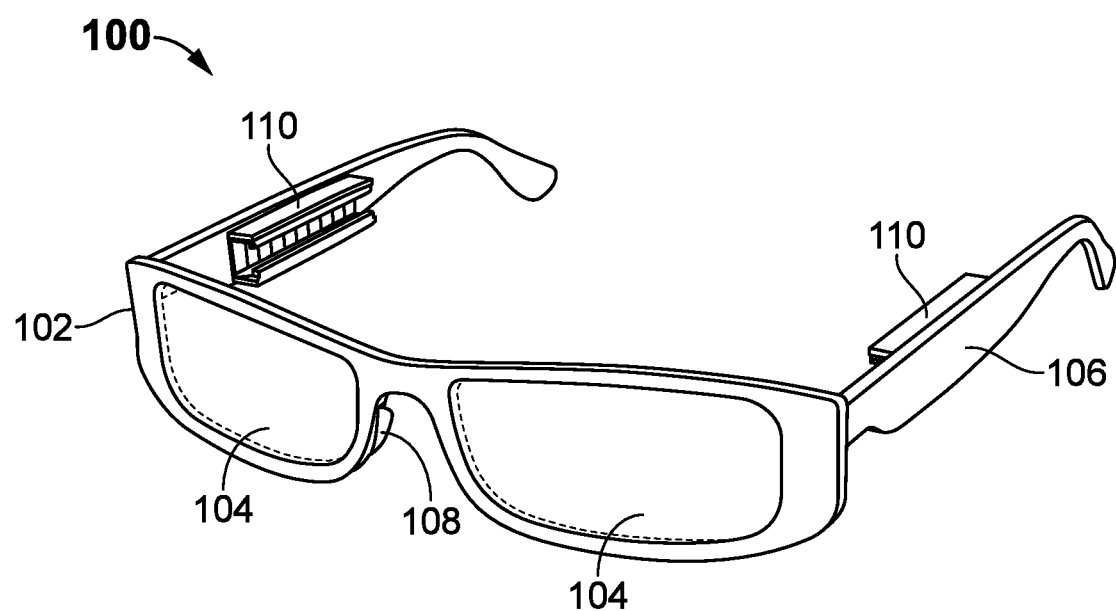
FIG. 2 shows a perspective view of the eyeglass in one embodiment of the present invention.

Referring to FIG. 2, the eyeglass 100 installed with the skin chamber 110, according to one embodiment of the present invention. The eyeglass 100 could be supplied in almost any designed color and shape. The eyeglass 100 comprises a frame 102 having a pair of lens holders 104 and a pair of nosepieces 108, and a pair of earpieces or temples 106. In one embodiment, the frame 102 is fabricated using an injection molded plastic. The frame 102 is injection-molded using a designer frame mold and a nylon derivative compound. In one embodiment, the nylon derivative compound could be hypoallergic cellulose acetate propionate (CAP) plastic. The frames 102 could be supplied in almost any specific vibrant color. The pair of lens holders 104 comprises a first lens holder and a second lens holder. Each lens holder 104 is assembled with the standard fabricated polycarbonate lens. Further, the glass assembled lenses are supplied with the common commercially available coatings and configurations. The lenses could be a prescription lens such as a single vision or bi-focal, or a non-prescription lens such as sunglasses. The pair of lens holders 104 could be coupled together via a middle piece or bridge to form the frame 102. The pair of lens holders 104 and the middle piece could be separate pieces or a single integral piece as frame 102.

In addition, the pair of temples 106 includes a first temple and a second temple. The pair of temples 106 are pivotably secured to both distal ends of the frame 102 via a hinge joint. The pair of nosepieces 108 includes a first nosepiece and a second nosepiece. The pair of nosepieces 108 are mounted on both proximal ends of the pair of lens holders 104. The pair of nosepieces 108 could be molded with the frame 102 or attached via one or more fasteners. Further, the pair of temples 106 and the pair of nosepieces 108 are mounted on the frame 102 in a conventional manner, which facilitates the mounting of eyeglass 100 on the user's nose with the pair of temples 106 cooperating with the user's ears to maintain the eyeglass 100 in predetermined relation to the user's eyes. In one embodiment, the skin chamber 110 is mounted on the inside of each temple 106. In one embodiment, the pair of temples 106 needs to be slightly larger in depth and height to accommodate and hide the skin chamber 110 on the inside of the pair of temples 106.

Figure 3:
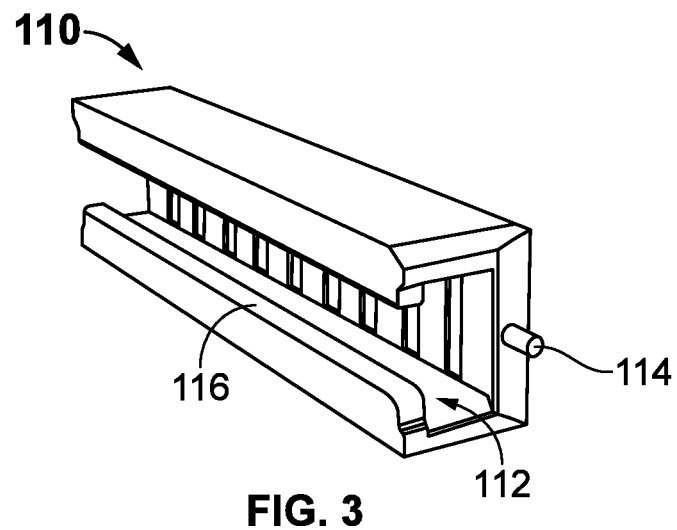
FIG. 3 shows a side perspective view of a skin chamber in one embodiment of the present invention.
Figure 4:
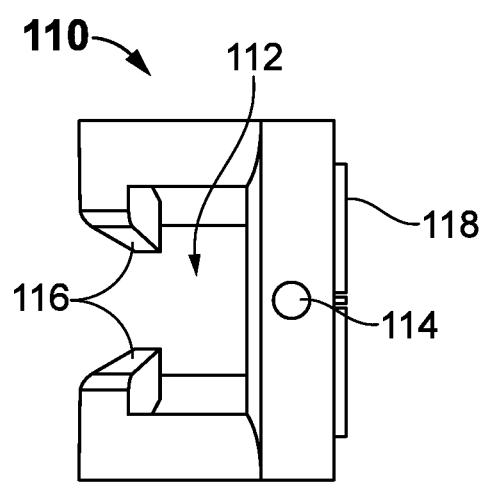
FIG. 4 shows an end view of the skin chamber in one embodiment of the present invention.
Figure 5:
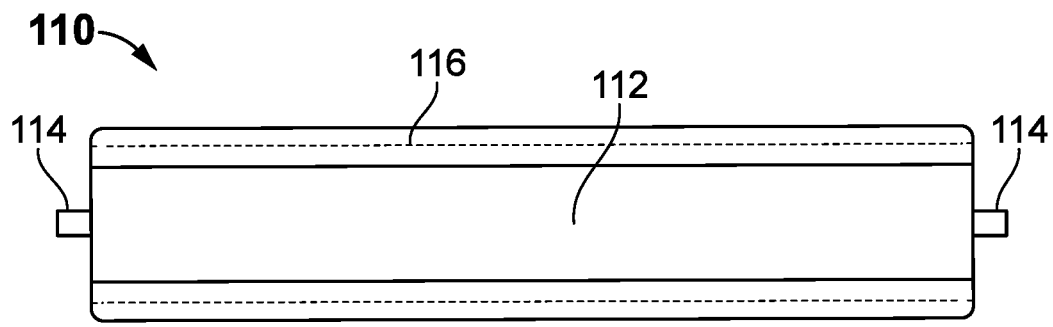
FIG. 5 shows a side view of the skin chamber in one embodiment of the present invention.

Referring to FIGS. 3-5, a side perspective view, an end view, and a side view of the skin chamber 110 respectively, according to one embodiment of the present invention. The eyeglass 100 fabricated with standard eyeglass techniques is equipped with the skin chambers 110 on the inside of each temple 106. After placing the eyeglass 100 on the user's head, the excess skin 172 near the temple 106 gets compressed. The excess skin 172 in the face is inserted into the skin chamber 110, where the excess skin 172 is gently captured. In one embodiment, the skin chamber 110 configuration provides an optimum comfortable fit to the skin. Therefore, the skin could be tensioned in the skin chamber 110 for a longer duration, for instance, a whole day, without any discomfort. In one embodiment, the frame 102, the pair of temples 106, and the skin chambers 110 are molded using the same lightweight plastic material. The lightweight plastic could be lightweight hypoallergenic plastic. The plastic could be supplied in almost any vibrant designer color and shape.

The skin chamber 110 comprises a cavity or a channel 112, a pair of hinge pins 114, a pair of internal edges 116, and a rear plate 118. The skin chambers 110 are mounted on the inside of the temples 106 via the pair of hinge pins 114. The hinge pins 114 are molded at the distal ends of the rear plate 118 of the skin chambers 110. In one embodiment, the pair of hinge pins 114 are configured to fit into a pair of hinge pin sockets or a pair of pivot points molded into the interior surface of the temples 106. During fabrication, the hinge pins 114 are inserted into the hinge pin socket or pivot points by gently bending the temples 106 and a chamber block is inserted before releasing the bend tension, thereby avoiding the release of skin chamber 110 from the temples 106. In one embodiment, the internal edges 116 comprises rounded edges to provide maximum comfort to the user 170. Also, the internal edges 116 are angled enough to retain the skin comfortably inside the cavity 112.

Figure 6:
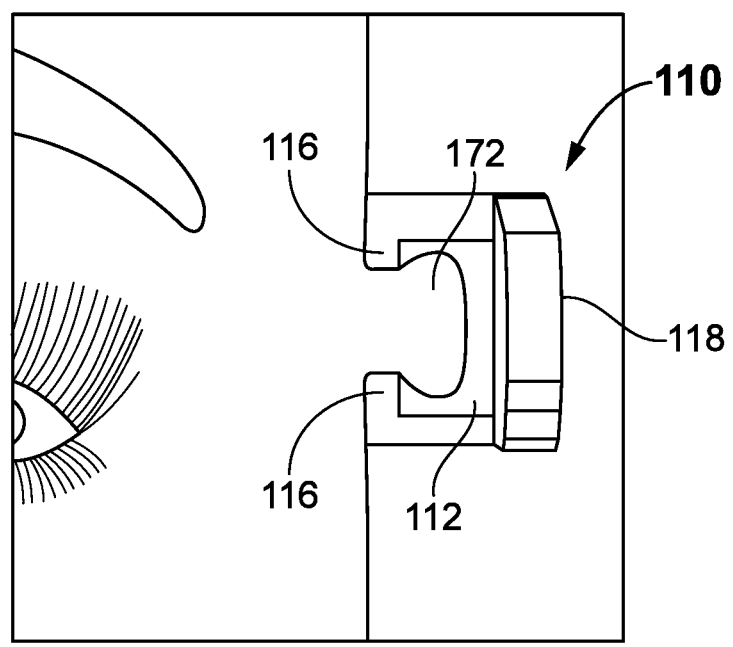
FIG. 6 shows the skin chamber accessing the excessive skin in one embodiment of the present invention.

Referring to FIG. 6, the skin chamber 110 is designed to provide an effective method of griping the excess skin 172, thereby removing the wrinkles and sagging skin for making the user face with a tighter and more youthful appearance. The loose or sagging skin from bones of the lower face, forehead, temples behind the eyes, cheeks, and around the mouth could be smoothed out using the skin chamber 110. A section of sagging skin from the face is pulled up and placed within the cavity 112 of skin chambers 110 mounted on the inside of the temples 106. In one embodiment, the cavity 112 with the rear plate 118 of the skin chamber 110 is designed in such a way to hold the skin and pivots a certain amount rotation to allow the movement of the skin and keep the skin from falling out. The small amount of rotation allows the skin chamber 110 to adjust and meet almost any head conformation for optimum comfort during use. Further, the skin remains in the skin chamber 110 until removing the eyeglass 100 from the head.

Figure 7:
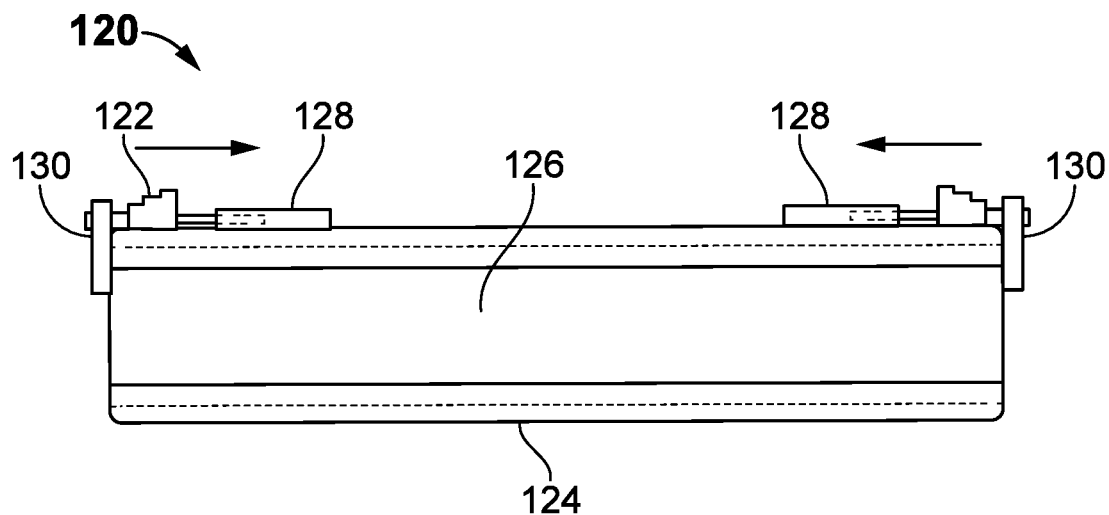
FIG. 7 shows a side view of a skin chamber in another embodiment of the present invention.
Figure 8A:
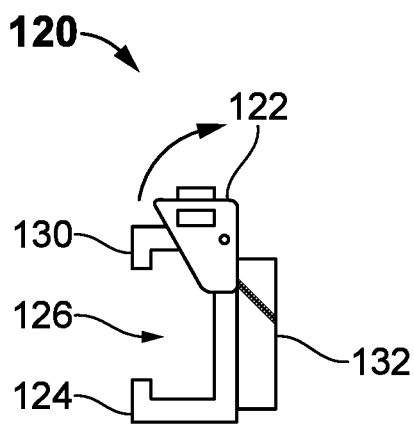
FIG. 8A shows an end view of the skin chamber in a closed position in another embodiment of the present invention.
Figure 8B:
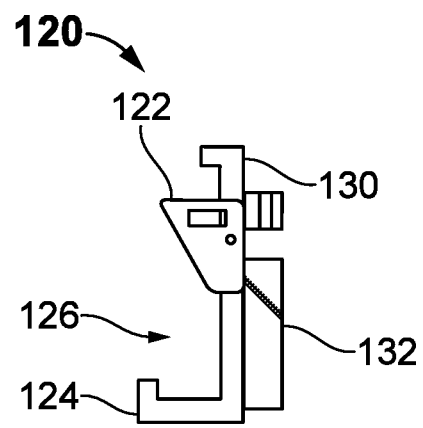
FIG. 8B shows an end view of the skin chamber in an open position in another embodiment of the present invention.

Referring to FIGS. 7 and 8A-8B, a side view and an end view of a skin chamber 120 respectively, according to another embodiment of the present invention. The skin chamber 120 comprises a hinged top surface 122, a lower edge 124, a cavity or a channel 126, a pair of locks 128, a pair of tongues 130, and a rear surface 132. The excess skin 172 is pulled up and placed over the lower edge 124 in the cavity 126 by unlatching the hinged top surface 122. The hinged top surface 122 is then closed by pressing into the skin chamber 120. In one embodiment, the locks 128 are spring-loaded locks. In one embodiment, the tongue 130 slides into the opening to close the skin chamber 120. The skin chamber 120 is bonded to the temple 106 using a thin spacer, thereby allowing the easy insertion of the excess facial skin 172 into the cavity 126 of the skin chamber 120. The cavity 126 could grip the excess skin 172 without any pain to the user 170, where the skin pulled tighter which reduces the wrinkles and lines on the face.

Figure 9:
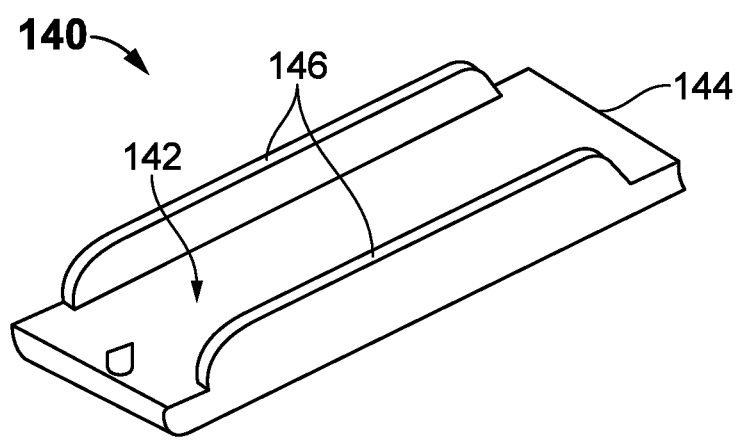
FIG. 9 shows a perspective view of a skin chamber in yet another embodiment of the present invention.
Figure 10:
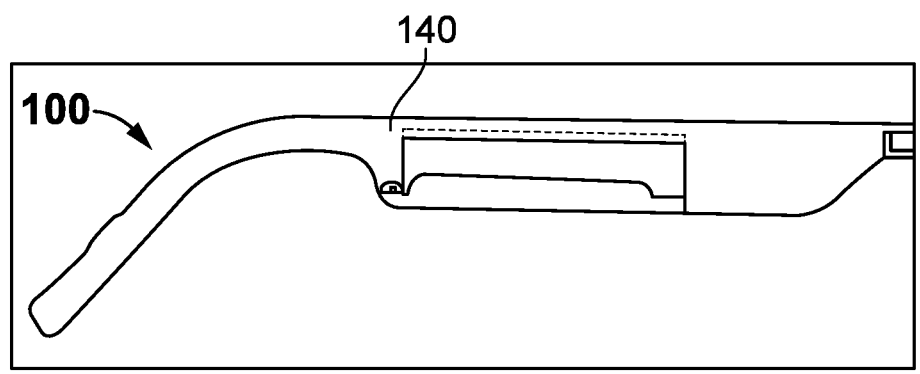
FIG. 10 shows the eyeglass installed with a skin chamber in yet another embodiment of the present invention.

Referring to FIGS. 9 and 10, a perspective view of a skin chamber 140 and the eyeglass 100 installed with a skin chamber 140 respectively, according to yet another embodiment of the present invention. In one embodiment, the skin chamber 140 comprises a channel 142 having a bottom surface 144 and a pair of side walls 146. In one embodiment, the side walls 146 are hingedly connected to the bottom surface 144 to form the channel 142. The excess skin 172 is pulled up and placed over the bottom surface 144 of the channel 142 by unlatching the hinged side walls 146. The side walls 146 are then closed by pressing into the skin chamber 140.

Figure 11:
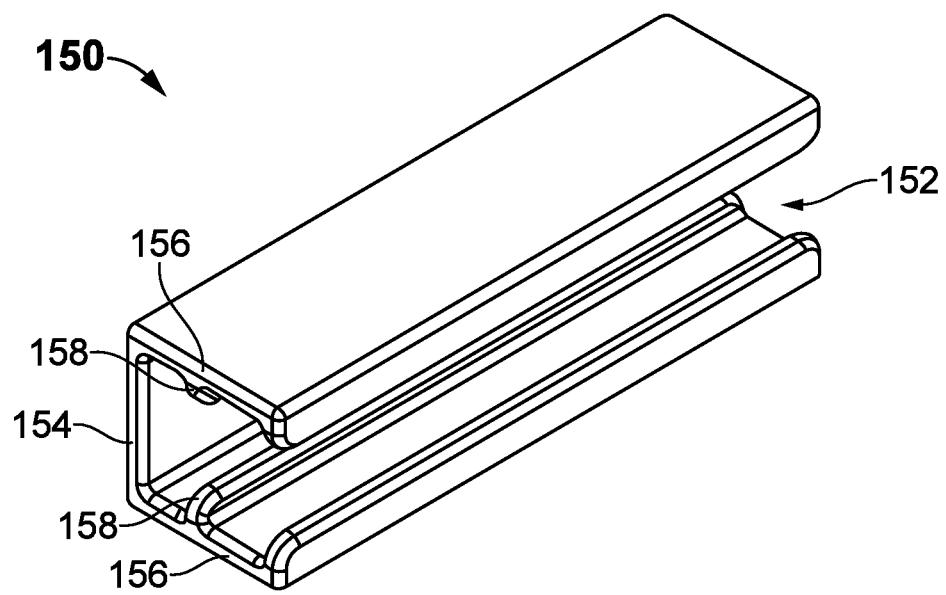
FIG. 11 shows a perspective view of the skin chamber in yet another embodiment of the present invention.
Figure 12:
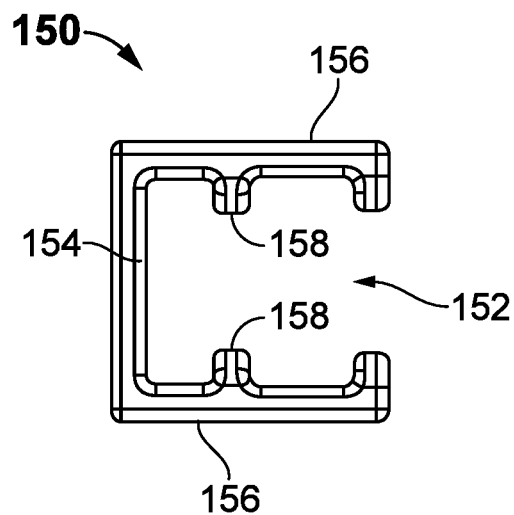
FIG. 12 shows a side view of the skin chamber in yet another embodiment of the present invention.

Referring to FIGS. 11 and 12, a perspective view and a side view of a skin chamber 150, according to yet another embodiment of the present invention. In one embodiment, the skin chamber 150 comprises a channel 152 having a bottom surface 154 and a pair of side walls 156. In one embodiment, each side wall 156 comprises a raised edge 158 configured to hold the excess skin 172 into the channel 152. The excess skin 172 is pulled up and placed over the bottom surface 154 of the channel 152.

Figure 13:
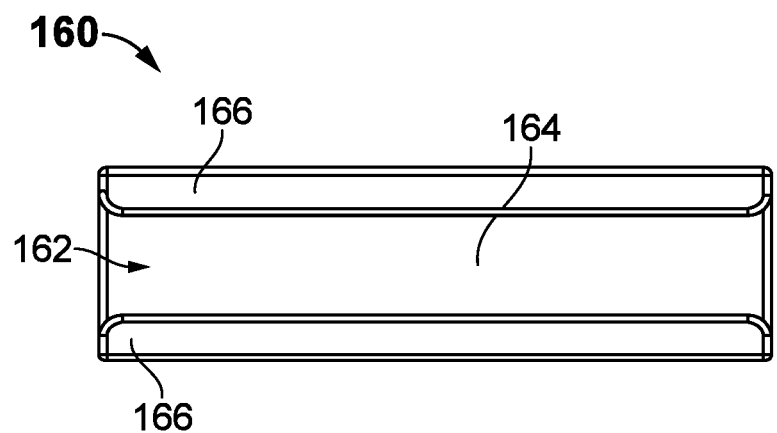
FIG. 13 shows a top view of a skin chamber in a closed position in yet another embodiment of the present invention.
Figure 14:
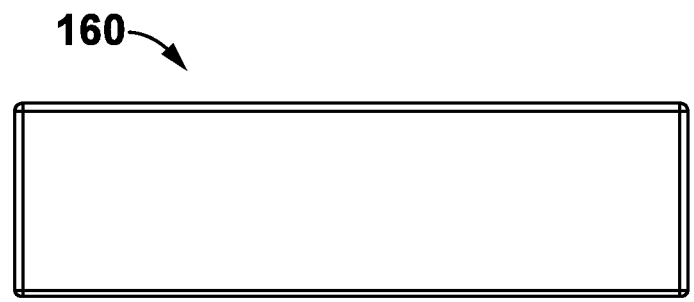
FIG. 14 shows a top view of the skin chamber in an open position in yet another embodiment of the present invention.

Referring to FIGS. 13 and 14, a top view of a skin chamber 160 in a closed position and an open position respectively, according to yet another embodiment of the present invention. In one embodiment, the skin chamber 160 comprises a channel 162 having a bottom surface 164 and a pair of side walls 166. The side walls 166 are pivotably connected to the bottom surface 164. The side walls 166 are opened to place the excess skin 172 and closed to provide wrinkle free appearance to the face.

The skin chambers (110, 120, 130, 140, 150, and 160) are designed to reduce the wrinkles in the facial skin by pulling the excess skin 172 upward towards the temple 106 of the eyeglass 100 and tucked into the skin chamber (110, 120, 130, 140, 150, and 160), where the excess skin 172 is held comfortably for many hours. The tension on the skin by pulling upward, tightens the facial skin, thereby reducing the wrinkles without surgery and expensive chemical compounds. Further, the skin chambers (110, 120, 130, 140, 150, and 160) are highly resistant to household chemicals. The skin chambers (110, 120, 130, 140, 150, and 160) could be washed in soap and water and dried to maintain cleanliness. In one embodiment, the skin chambers (110, 120, 130, 140, 150, and 160) and pivot connecting means could be available separately, which could be adhesively bonded to the temples 106. The temples 106 are deep enough to hide the skin chambers (110, 120, 130, 140, 150, and 160) during usage. Further, the skin chambers (110, 120, 130, 140, 150, and 160) could be supplied with the complementary or matching color to mate with the temples 106 of the existing eyeglass frame. In addition, the skin chamber apparatus of the present invention is fabricated, but not limited to, the following materials and processes.

The eyeglass frame 102 is injection molded using various designer frame molds and a nylon derivative compound. The nylon derivative compound is a hypoallergenic cellulose acetate propionate plastic (CAP). The CAP is a lightweight material, which has more transparency and gloss. The frame 102 is highly resistant to household chemicals and ultraviolet degradation. These frames 102 are designed to allow the insertion of almost any lens material. In particular, the frame 102 is optimized for polycarbonate plastic lenses with single or bi-focal vision. The frame 102 could also accommodate Transitions™ or sunglass tints, and various coatings. The temples 106 have a deeper draft than standard temples and the skin chamber hinge pockets are molded in as part of the temple construction.

The frames 102 could be supplied in almost any specific vibrant color. A distinctive color may be chosen to enhance the product recognition factor, which could dramatically improve the market adoption of the product, for example, Christian Louboutin shoes with the red soles.

The skin chambers (110, 120, 130, 140, 150, and 160) are configured in a 'C' shape with the rear plate (118 and 132). The rear plate (118 and 132) of the skin chamber (110, 120, 130, 140, 150, and 160) is mounted toward the temple 106 on the interior surface of the molding. The interior edges of the 'C' shape are gently rounded for comfort and sharp enough to retain the 'pinched' excess skin 172 comfortably for hours. The skin chambers (110, 120, 130, 140, 150, and 160) are mounted in the hinge pockets by gently flexing the temple 106 and inserting the chamber hinge pins into the pockets before releasing the flex. The hinge pockets securely hold the skin chamber (110, 120, 130, 140, 150, and 160). The hypoallergenic CAP plastic frame 102 could easily be washed if makeup or skin oils get on them during daily usage.

Advantageously, the skin chambers are designed to be aesthetic and effective in the application. The relative ease of manufacture and the moderately inexpensive components provide good marketability for the manufacturer. The user benefits from greatly reduced facial skin wrinkles without surgery or expensive chemicals, which could provide considerable market interest in the product.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A pair of eyeglass comprises:
   a frame having a pair of lens holders coupled together via a middle piece or bridge, and a pair of nose pieces mounted on both proximal ends of the pair of lens holders;
   a pair of temples pivotably secured to both distal ends of the frame, and a skin chamber mounted on an inside of each temple,
   wherein the skin chamber is configured to hold excess skin on a user's face to eliminate and/or reduce wrinkles on the face and, wherein the skin chamber comprises a cavity with a rear plate configured to hold the excess skin on the user's face.

2. The eyeglass of claim 1, wherein the pair of temples are pivotably secured to both ends of the frame via a hinge joint.

3. The eyeglass of claim 1, wherein the skin chamber further comprises a pair of internal edges angled enough to retain the skin comfortably inside the cavity.

4. The eyeglass of claim 3, wherein the internal edges comprises rounded edges to provide maximum comfort to the user.

5. The eyeglass of claim 1, wherein the cavity with the rear plate is designed in such a way to hold the skin and pivots a certain amount rotation to allow the movement of the skin and keep the skin from falling out.

6. A pair of eyeglass comprises:
   a frame having a pair of lens holders coupled together via a middle piece or bridge, and a pair of nose pieces mounted on both proximal ends of the pair of lens holders;
   a pair of temples pivotably secured to both distal ends of the frame, and a skin chamber mounted on an inside of each temple,
   wherein the skin chamber is configured to hold excess skin on a user's face to eliminate and/or reduce wrinkles on the face and, wherein the chamber further comprises a pair of hinge pins molded at the distal ends of the rear plate.

7. The eyeglass of claim 6, wherein the skin chambers are mounted inside the temples via the pair of hinge pins.

8. The eyeglass of claim 6, wherein the pair of hinge pins are configured to fit into a pair of hinge pin sockets or a pair of pivot points molded into the interior surface of the temples.

9. The eyeglass of claim 8, wherein the hinge pins are inserted into the hinge pin sockets or pivot points by gently bending the temples and a chamber block is inserted before releasing the bend tension, thereby avoiding the release of skin chamber from the temples.

10. A pair of eyeglass comprises:
    a frame having a pair of lens holders coupled together via a middle piece or bridge, and a pair of nose pieces mounted on both proximal ends of the pair of lens holders;
    a pair of temples pivotably secured to both distal ends of the frame, and a skin chamber mounted on an inside of each temple,
    wherein the skin chamber comprises a pair of hinge pins inserted into a pair of hinge pin sockets or a pair of pivot points configured to mount the skin chamber inside each temple and a cavity with a rear plate configured to hold excess skin on a user's face to eliminate and/or reduce wrinkles on the face.

11. The eyeglass of claim 10, wherein the pair of temples are pivotably secured to both ends of the frame via a hinge joint.

12. The eyeglass of claim 10, wherein the pair of hinge pins are molded at the distal ends of the rear plate.

13. The eyeglass of claim 10, wherein the skin chambers are mounted inside the temples via the pair of hinge pins.

14. The eyeglass of claim 10, wherein the hinge pins are inserted into the hinge pin sockets or pivot points by gently bending the temples and a chamber block is inserted before releasing the bend tension, thereby avoiding the release of skin chamber from the temples.

15. The eyeglass of claim 10, wherein the skin chamber further comprises a pair of internal edges angled enough to retain the skin comfortably inside the cavity.

16. The eyeglass of claim 15, wherein the internal edges comprises rounded edges to provide maximum comfort to the user.

* * * * *